US008258071B2

(12) United States Patent
Bouizi et al.

(10) Patent No.: US 8,258,071 B2
(45) Date of Patent: Sep. 4, 2012

(54) CATALYST IN THE FORM OF GRAINS COMPRISING AN ACIDIC POROUS CORE SURROUNDED BY A UNIFORM OUTER LAYER

(75) Inventors: Younes Bouizi, Mulhouse (FR); Valentin Valtchev, Mulhouse (FR); Loiec Rouleau, Charly (FR); Nicolas Bats, Pomeys (FR); Laurent Simon, Lyons (FR)

(73) Assignee: IFP Energies nouvelles, Rueil-Malmaison Cedex (FR)

( * ) Notice: Subject to any disclaimer, the term of this patent is extended or adjusted under 35 U.S.C. 154(b) by 746 days.

(21) Appl. No.: 10/587,854

(22) PCT Filed: Jan. 13, 2005

(86) PCT No.: PCT/FR2005/000081
§ 371 (c)(1),
(2), (4) Date: Oct. 14, 2008

(87) PCT Pub. No.: WO2005/082530
PCT Pub. Date: Sep. 9, 2005

(65) Prior Publication Data
US 2009/0036294 A1 Feb. 5, 2009

(30) Foreign Application Priority Data

Jan. 29, 2004 (FR) ...................................... 04 00841

(51) Int. Cl.
*B01J 29/06* (2006.01)
(52) U.S. Cl. ............................... 502/64; 502/67; 502/69
(58) Field of Classification Search .................... 502/64, 502/67, 69
See application file for complete search history.

(56) References Cited

U.S. PATENT DOCUMENTS

| 4,088,605 | A |   | 5/1978 | Rollmann |  |
|---|---|---|---|---|---|
| 4,420,419 | A | * | 12/1983 | Ogawa et al. | 502/68 |
| 4,861,739 | A |   | 8/1989 | Springer et al. |  |
| 5,082,814 | A | * | 1/1992 | Stockwell et al. | 502/68 |
| 6,504,074 | B2 | * | 1/2003 | Verduijn et al. | 585/475 |
| 6,872,865 | B1 | * | 3/2005 | Koster et al. | 585/475 |
| 2003/0121827 | A1 | * | 7/2003 | van den Berge et al. | 208/120.01 |

OTHER PUBLICATIONS

Twaiq et al., Fuel Processing Technology v.85, issue 11, p. 1283-1300, 2003.*
Goossens et al., "Oriented FAU Zeolite Films on Micrometer-Sized EMT crystals", Adv. Mater., 1999, 11, No. 7, 561-564.*
Goossens et al., "Synthesis and Characterization of Epitaxial FAU-on-EMT Zeolite Overgrowth Materials", Eur. J. Inorg.Chem., 2001, 1167-1181.*
Goossens Am et al., "Oriented fau zeolite films on micrometer-sized EMT crystals" Advanced Materials, Weinheim, DE, vol. 11, No. 7, May 7, 1999.
Ann M. Goossens, et al., "Synthesis and Characterization of Epitaxial FAU-on-EMT Zeolite Overgrowth Materials," European Journal of Inorganic Chemistry, vol. 2001, No. 5, May 2001.
Kloetstra KR et al., "Overgrowth of Mesoporous MCM-41 on Faujasite" Microporous Materials, vol. 6, No. 5/6, Jul. 1996, pp. 287-293.
Weber RW et al., "Characterization and elimination of the external acidity of ZSM-5" Microporous Materials, Aug. 1996, vol. 7, No. 1, pp. 15-25.
J. Sterte et al., "Application of the seed-film method for the preparation of structured molecular sieve catalysts" Catalysis Today, vol. 69, 2001, pp. 323-329.

* cited by examiner

*Primary Examiner* — Elizabeth Wood
(74) *Attorney, Agent, or Firm* — Millen, White, Zelano & Branigan, P.C.

(57) ABSTRACT

The invention relates to a catalyst that comes in the form of grains, each grain consisting of a core covered by at least one external layer, the core consisting of an acidic porous solid and having a size of between 0.1 micron and 0.4 millimeter, in which the external layer has a uniform thickness with a uniformity criterion C, which is less than 0.30, whereby said uniformity criterion C is defined as being equal to an average, on a number N of catalyst grain samples, of the ratio of the difference between the maximum thickness, $Ei_{max}$, of the external layer and the minimum thickness, $Ei_{min}$, of this same layer to the average of these two thicknesses $Ei_{max}$ and $Ei_{min}$.

14 Claims, No Drawings

CATALYST IN THE FORM OF GRAINS COMPRISING AN ACIDIC POROUS CORE SURROUNDED BY A UNIFORM OUTER LAYER

TECHNICAL FIELD

This invention relates to the field of catalysts that come in the form of grains each comprising a core with an acidic porous solid base and surrounded by at least one uniform external layer.

PRIOR ART

International Patent Application WO 97/33684 describes a method for preparation of a zeolite-based film on the surface of different substrates.

International Patent Application WO 99/28031 describes a catalyst that comprises crystals of a first zeolite and a discontinuous layer of crystals of a second zeolite.

The catalysts of the prior art have a certain number of drawbacks. In particular, the non-uniformity of the external layer does not make it possible to obtain an optimum diffusional selectivity.

Non-uniformity of the external layer is defined as a discontinuity or variation of the thickness of said layer around the core. Diffusional selectivity is defined as the preferred passage of certain reagents or products relative to others. It is all the more satisfactory the faster the passage and the more effective the separation of the radicals. The separation is all the more effective as the covering of the layer is total, and the passage is all the faster as the thickness of the layer is fine and therefore uniform.

Moreover, the existing processes generally are not suited for covering with a uniform layer a core with a porous solid base whose size is less than or equal to 0.4 millimeter. The processes for preparation of the prior art are used on porous substrates of a relatively large size, on the order of a millimeter, with a slight curvature, facilitating the homogeneous covering by fine layers of nanocrystals.

SUMMARY OF THE INVENTION

A catalyst that comes in the form of grains each comprising a core with an acidic porous solid base and surrounded by at least one uniform external layer as well as a process that makes possible the production of grains of said catalyst have been found, whereby each grain is formed by a small core, i.e., of a size that is less than or equal to 0.4 millimeter and that makes it possible to cover said core with at least one external layer that has a uniform thickness.

The uniformity of the thickness of the external layer can be evaluated using a criterion, so-called uniformity criterion C, which is defined as being equal to an average, on a number N of catalyst grain samples, of the ratio of the difference between the maximum thickness, $Ei_{max}$, of the external layer, and the minimum thickness, $Ei_{min}$, of this same layer to the average of these two thicknesses $Ei_{max}$ and $Ei_{min}$.

The evaluation of this uniformity criterion can be made by any means that is known to one skilled in the art, such as, for example from a photograph or an analysis of images obtained from characterization by electronic microscopy.

The process for preparation of the catalyst according to the invention comprises:

a) A stage for preparation of crystals or crystal agglomerates to form the core of each of the grains, the core consisting of a porous solid, b) A stage for modification of the core of each grain to impart an at least partial acidity to said core, c) A stage for adhesion of nuclei distributed uniformly over the surface of the core of each grain, whereby said nuclei consist of nanocrystals based on the material used for the external layer, and d) A stage of growth of said nuclei on the core of each grain.

DETAILED DESCRIPTION OF THE INVENTION

An object of this invention relates to a catalyst that comes in the form of grains, each grain being formed by a core covered with at least one external layer, the core consisting of an acidic porous solid and having a size of between 0.1 micron and 0.4 millimeter, in which the external layer has a uniform thickness with a uniformity criterion C that is less than 0.30, whereby said uniformity criterion C is defined as being equal to an average, on a number N of catalyst grain samples, of the ratio of the difference between the maximum thickness, $Ei_{max}$, of the external layer and the minimum thickness, $Ei_{min}$, of this same layer to the average of these two thicknesses $Ei_{max}$ and $Ei_{min}$.

The average with the base of the uniformity criterion C is generally carried out from a significant number of samples of catalyst grains. The number N of catalyst grain samples is preferably greater than or equal to 100.

The catalyst according to the invention has an external layer whose uniformity criterion can be expressed, for example, by the following expression:

$$C = \frac{2}{N} * \sum_{i=1}^{N} \frac{Ei_{max} - Ei_{min}}{Ei_{max} + Ei_{min}}$$

in which:

$Ei_{min}$ represents the minimum thickness of the external layer around a grain i, and $Ei_{max}$ represents the maximum thickness of this same external layer and N corresponds to the number of samples of grains used to carry out this statistical characterization of the uniformity.

The evaluation of the uniformity criterion can be made by any means that is known to one skilled in the art, such as, for example, from a photograph or an analysis of images obtained from characterization by electronic microscopy.

In the case where the uniformity criterion is measured by scanning electronic microscopy, the catalyst grains are dispersed in an Epon- or Araldite-type synthetic resin. After polymerization of the resin, the blocks that contain the catalyst grains were demolded and form a cylinder of about 5 mm in diameter. They were cut with an ultramicrotome (LKB 8800 ultrotome III) by first using a glass knife. The resin is cut at its end so as to obtain a small surface area (<0.5 mm$^2$) in the shape of a trapezoid. After detecting a zone of interest, ultrafine sections of about 80 nm were made with a diamond knife. The sections were then deposited on a substrate for observation with a scanning electronic microscope. In order to observe the sections, it is necessary to plate the sections with gold by vacuum evaporation (argon atmosphere). The equipment that is used is a PHILIPS XL-30 microscope with a 10 to 50,000× magnification.

By using the criterion C presented in the preceding paragraph, the catalyst according to the invention has a uniform external layer with a uniformity criterion of less than 0.3, preferably less than 0.2, and more preferably less than 0.1.

Preferably at least 95%, preferably at least 97%, more preferably at least 99%, and even 100%, of the surface area of the core of the catalyst grains according to the invention is covered by at least one external layer. This covering imparts an improved diffusional selectivity to each grain.

According to the invention, the chemical composition of the core can be the same as or different from that of the external layer. The chemical composition of the core is preferably different from that of the external layer. The crystallographic structure of the core can be independent of that of the external layer, i.e., it can be identical or different.

Each grain of the catalyst according to the invention can have several external layers. According to the invention, at least one of these layers is uniform with a uniformity in accordance with the criterion presented above. This layer advantageously coats at least 95%, preferably at least 97%, more preferably at least 99%, and even 100%, of the surface area of the core of the grains or the lower layer on which it is supported.

Each grain of the catalyst according to the invention preferably comprises a single uniform external layer and covers at least 95% of the surface of the core of the grains.

The core of a catalyst grain according to the invention can be any porous structure that has a pore size of between 0.1 nm and 50 nm.

The size of the core of the grains of the catalyst according to the invention is between 0.1 micron and 0.4 mm. The size of the core of the grains of the catalyst according to the invention is preferably between 0.2 and 100 microns, more preferably between 0.5 and 20 microns.

The core of each of the grains of the catalyst according to the invention can be a crystallized microporous solid or a structured mesoporous solid. The core of a grain can comprise a single crystal or a number of crystals so as to form an agglomerate. In the case of a crystallized microporous solid, the diameter of the micropores of said solid can be between 0.1 and 2 nm. In the case of a structured mesoporous solid, the diameter of the mesopores of said solid can be between 2 and 50 nm.

The crystallized microporous solids can be selected from the group that is formed by the alumino-phosphates, the metallo-alumino-phosphates, the silicates, the metallo-silicates, in particular the zeolites that are described in the atlas of zeolites (Atlas of Zeolite Framework Types, Ch. Baerlocher, W. M. Meier, D. H. Olson, Elsevier, $5^{th}$ Revised Edition, 2001) such as the zeolites that belong to the FAU structural type (X zeolite, Y zeolite), the BEA structural type (beta zeolite), the MFI structural type (ZSM-5 zeolite), the EUO structural type (EU-1 zeolite, ZSM-50 zeolite, TPZ-3 zeolite), the NES structural type (NU-87 zeolite), the TON structural type (ZSM-22 zeolite, theta-1 zeolite, NU-10 zeolite), the MTT structural type (ZSM-23 zeolite), the FER structural type (ferrierite zeolite), the MWW structural type (MCM-22 zeolite), the MEL structural type (ZSM-11 zeolite), the MFS structural type (ZSM-57 zeolite), the MOR structural type (mordenite zeolite), the MTW structural type (ZSM-12 zeolite), the OFF structural type (offretite zeolite), the MAZ structural type (mazzite zeolite), the EMT structural type (EMC-2 zeolite) or the NU-86, NU-88, IM-5, EU-2, ZBM-30, ZSM-48 and IM-12 zeolites.

The structured mesoporous solids can preferably be selected from the group that is formed by the MCM-41, MCM-48 and SBA-15 solids.

According to this invention, the core of a grain of the catalyst is acidic. The acidic nature of the core can be measured by any means known to one skilled in the art, such as, for example, by adsorption of pyridine or lutidine measured by infrared analysis or by thermogravimetric analysis.

The external layer of each grain of the catalyst of the invention is preferably a crystallized microporous solid. The crystallized microporous solid of the external layer has pores that have a diameter of preferably between 0.1 and 2 nm, more preferably between 0.1 and 1.5 nm, and even more preferably between 0.1 and 1 nm.

The external layer can be selected from the group that is formed by the alumino-phosphates, the metallo-alumino-phosphates, the silicates, the metallo-silicates, in particular the zeolites that are described in the atlas of zeolites (Atlas of Zeolite Framework Types, Ch. Baerlocher, W. M. Meier, D. H. Olson, Elsevier, $5^{th}$ Revised Edition, 2001), such as the zeolites that belong to the FAU structural type (X zeolite, Y zeolite), the BEA structural type (beta zeolite), the MFI structural type (ZSM-5 zeolite, silicalite-1 zeolite), the EUO structural type (EU-1 zeolite, ZSM-50 zeolite, TPZ-3 zeolite), the NES structural type (NU-87 zeolite), the TON structural type (ZSM-22 zeolite, theta-1 zeolite, NU-10 zeolite), the MTT structural type (ZSM-23 zeolite), the FER structural type (ferrierite zeolite), the MWW structural type (MCM-22 zeolite), the MEL structural type (ZSM-11 zeolite, silicalite-2 zeolite), the MFS structural type (ZSM-57 zeolite), the MOR structural type (mordenite zeolite), the MTW structural type (ZSM-12 zeolite), the OFF structural type (offretite zeolite), the MAZ structural type (mazzite zeolite), the EMT structural type (EMC-2 zeolite), the LTA structural type (A zeolite) or the NU-86, NU-88, IM-5, EU-2, ZBM-30, ZSM-48 and IM-12 zeolites.

The core and the external layer are preferably zeolites. The zeolite of the core differs from the zeolite of the external layer by the structural type, the chemical composition of the crystalline framework and/or by the nature of the compensating cations; very preferably, the zeolite of the core differs from the zeolite of the external layer by the chemical composition of the crystalline framework.

The combinations of zeolites to form the core-external layer unit can be selected from all the zeolites that are described in the atlas of zeolites (Atlas of Zeolite Framework Types, Ch. Baerlocher, W. M. Meier, D. H. Olson, Elsevier, $5^{th}$ Revised Edition, 2001).

The average thickness of the external layer over all of the grains of the catalyst can be variable based on the catalysts and also, for a determined catalyst, based on reactions considered and experimental conditions, in particular temperature, pressure and/or the rate of circulation of the fluid. The average thickness of the external layer over all of the grains is defined by the formula:

$$C = \frac{2}{N} * \sum_{i=1}^{N} (Ei\max + Ei\min)$$

The average thickness of the external layer over all of the grains is preferably between 0.01 and 100 microns, more preferably between 0.1 and 10 microns.

The core of a grain, and, because of the uniformity of the external grain, the grain itself can have any shape, preferably a spherical, cylindrical or ellipsoidal shape, more preferably a spherical shape.

A grain generally comes in the same form as the core because of the uniformity of the external layer of said grain.

Advantageously, the core of a grain of the catalyst represents at least 10% and at most 99% of the total volume of said grain. The radius of the core of this grain can represent at least 40%, more advantageously at least 60%, and even more advantageously at least 70% of the total radius of said grain.

The catalyst according to the invention can contain one or more elements, in particular metals or their cations, or compounds of these elements, in particular metal oxides. The catalyst according to the invention can comprise at least one metal that is selected from the group that is formed by the elements Cu, Ag, Ga, Mg, Ca, Sr, Zn, Cd, B, Al, Sn, Pb, V, P, Sb, Cr, Mo, W, Mn, Re, Fe, Co, Ni, Pt, Pd, Re and Rh.

The catalyst according to the invention can comprise one or more hydrogenation/dehydrogenation component(s), such as the metals Ni, Co, Pt, Pd, Re and Rh.

The catalyst according to the invention is generally in cationic form, for example in hydrogen form or in ammonium form.

The catalyst according to the invention can comprise a binder that makes it possible to keep the grains together, optionally in a particular form, for example in the form of a pellet, an extrusion product, ball or powder. The binder can also have an inert diluent function, for example to control the activity per unit of weight of catalyst. Thus, the binder can comprise one or more cations or oxides derived from elements selected from the group that is formed by Cu, Ag, Ga, Mg, Ca, Sr, Zn, Cd, B, Al, Sn, Pb, V, P, Sb, Cr, Mo, W, Mn, Re, Fe, Co, Ni, Pt, Pd, Re and Rh.

Another object of this invention relates to a process for preparation of the catalyst according to the invention, i.e., a catalyst that comes in the form of grains, each grain being formed by a core that consists of an acidic porous solid, whereby said core is covered by a uniform external layer. Said process comprises:
   a) A stage for preparation of crystals or crystal agglomerates to form the core of each of the grains, whereby the core consists of a porous solid,
   b) A stage for modification of the core of each grain to impart an at least partial acidity to said core,
   c) A stage for adhesion of nuclei distributed uniformly over the surface of the core of each grain, said nuclei consisting of nanocrystals based on the material used for the external layer, and
   d) A stage of growth of said nuclei on the core of each grain.

The order of presentation of the stages of the process of the invention does not necessarily correspond to the order of carrying out these stages. By way of example, stage b) can be carried out directly on the core of a grain after stage a) for preparation of said grain or, alternately, on a composite that comprises the core and its external layer, after stage d) of the process.

During stage a), the core of each of the grains of the catalyst according to the invention can be prepared by any means known to one skilled in the art. The crystals and crystal agglomerates for forming the core of each of the grains are prepared during a single synthesis stage corresponding to stage a).

During stage b) of the invention, a modification of the core of each grain is carried out to impart an at least partial acidity to said core. This modification can be carried out by any means known to one skilled in the art.

For example, in the case of a core with a zeolite base that comprises ions of alkaline metals, modification stage b) should generally make it possible to eliminate, at least partially, these alkaline metals.

The modification of stage b) imparts to the core an at least partial acidity. This acidity can also be total, i.e., all the exchange sites of the core are combined with a proton.

This modification stage b) can be carried out by at least one ion exchange with an acid, in particular, a mineral acid such as hydrochloric acid and/or with an ammonium compound obtained by ion exchange with a solution of an ammonium salt, such as ammonium chloride. The ion exchange can be carried out by means of a thick suspension, on one or more occasions, in an ion exchange solution. The zeolite of the core is generally calcined before the ion exchange so as to eliminate any absorbed organic substance to the extent that the ion exchange is thereby facilitated. The ion exchange can be carried out by any means and in any operating condition that is known to one skilled in the art.

Before the implementation of stage c) of the process of the invention, the core optionally can undergo various treatments. For a core that is based on zeolite or mesoporous material, standard heat and/or chemical modification treatments that are known to one skilled in the art can be considered, in particular ion exchange operations to put the zeolites in the desired cationic form.

Surface treatments optionally can be performed to extract the elements that are harmful to the implementation of stages c) and d) of the process of the invention so as to promote the reactivity of the core and/or the fixation of nanocrystals from which the external layer will grow.

During stage c) of the process of the invention, nuclei that are distributed uniformly adhere to the surface of the core of each grain, whereby said nuclei consist of nanocrystals based on the material that is used for the external layer.

The nanocrystals may have a size of between 40 and 500 nm, preferably between 50 and 400 nm, and more preferably between 60 and 200 nm.

This adhesion can be carried out by any means known to one skilled in the art. By way of example, this adhesion can be carried out with chemical bonding agents or a grafting agent.

Alternatively, this adhesion can be carried out with agents for reversing the surface charge, such as, for example, the cationic polymers described by V. Valtchev et al. ("Zeolites and Mesoporous Materials at the Dawn of the 21$^{st}$ Century," Proceedings of the 13$^{th}$ International Zeolite Conference, Montpellier, France, 8-13 Jul. 2001, *Studies in Surface Science and Catalysis*, Vol. 135, p. 298).

This adhesion can be carried out by, for example, mixing the core zeolite with the nuclei of the zeolite of the layer, in a stirred and aqueous medium, after a polymer is adsorbed on one of the two zeolites, which reverses the surface charge and ensures an electrostatic connection. The adsorption can be carried out in an aqueous stirred medium with one of the two zeolites, for example with a cationic polymer at a pH of more than 7.

The nanocrystals that constitute the nuclei are generally zeolites that can be synthesized by a method for synthesis of colloidal zeolites, for example by a so-called "clear solution" method as it is described in the article "Small Particles Technology," J. E. Otterstedt, D. A. Brandreth, Plenum Press, 1998.

During stage d) of the invention, the nuclei that have adhered to the core of each grain undergo growth. The growth of the external layer, which is generally a zeolite, can be carried out in one or more operation(s), for example by immersion of the core, on which the nuclei have been deposited, in a stirred and aqueous medium or under hydrothermal conditions.

The formation of the external layer by growth of nuclei distributed uniformly over the surface of the core of each grain involves a discontinuity between the core and the layer. This discontinuity is at all points of the core/external layer junction for each of the grains of the catalyst. This discontinuity is material, i.e., the overall structure of the catalyst according to the invention is not homogeneous to the extent that it has, for each grain, a core and an external layer that are identified. This discontinuity between the core and the layer can be observed by electronic microscopy (scanning, transmission?). The junction between the core and the layer makes it possible to distinguish, for each grain of the catalyst according to the invention, the presence of a core and that of an external layer that covers said core.

In addition to the modification operations carried out during stage b) of the process of the invention, the process can comprise additional stages for introducing an additional active phase in each grain, and optionally in the binder, forming the catalyst. These additional stages can be carried out at any point in the process of the invention. They may relate to the core of the grain, to the external layer of this grain, to the entirety of the grain, namely the core and the external layer, or to the binder.

In a general manner, it is possible to replace the cation(s) of crystals of the core and/or of the external layer of the catalyst by any cation or any metal cation, in particular those of groups IA, IB, IIA, IIB, IIIA, and IIIB, including the rare earths, and those of group VIII, including the noble metals, of the periodic table. It is also possible to replace this cation or these cations by tin, lead and bismuth. The exchange is generally carried out with a solution that contains a suitable cation salt, in a way known to one skilled in the art. The exchange can be done selectively on the core before the deposition of the external layer or both on the core and on the external layer.

The process of the invention can comprise a stage for depositing one or more elements, in particular metals or cations thereof, or compounds of these elements, in particular metal oxides. The catalyst according to the invention can comprise at least one metal that is selected from the group that is formed by the elements Cu, Ag, Ga, Mg, Ca, Sr, Zn, Cd, B, Al, Sn, Pb, V, P, Sb, Cr, Mo, W, Mn, Re, Fe, Co, Ni, Pt, Pd, Re and Rh.

This deposition can be carried out at the core and/or at the external layer surrounding said core. The stage for depositing this or these element(s) can be carried out by an ion exchange or by an impregnation with said element, cation or compound, or with a suitable precursor of said cation or compound. Such an ion exchange or such an impregnation can be carried out on the zeolite of the core or on the external layer, for example in its crude synthesis form that may or may not be calcined, in hydrogen form and/or in ammonium form and/or in any other exchanged form (metal or not).

In most of the cases of an ion exchange, it is preferable to carry out only one partial exchange of metal, whereby the remaining sites are occupied by another cation, in particular the hydrogen or ammonium cations. In some cases, it may be desirable to introduce two metal cations or more by an ion exchange.

In the cases where the zeolite of the core and/or the layer that encases said core are impregnated with a metal compound, the metal compound can be added with a content of less than 20% by weight, preferably less than 10% by weight, and more preferably less than 5% by weight, relative to the final catalyst weight.

The impregnation and the exchange can be carried out by any means known by one skilled in the art.

The process of the invention can include an activation treatment. These treatments comprise the reduction, for example in an atmosphere that comprises hydrogen, so as to produce a metal or other reduced forms. These treatments can be carried out at any point in the preparation of the catalyst. These treatments optionally can be carried out subsequently during the use of the catalyst inside a reaction zone.

The process of the invention may include a stage for shaping using a binder that makes it possible to keep the grains together. This shaping may comprise the mixing of the catalyst grains with the binder followed by, for example, extrusion, granulation, drying by atomization or a drop coagulation of said mixture. The binder optionally can be mixed in advance with an active compound and can have the function of an inert diluent to control the activity per unit of weight of catalyst.

The binder can be any substance used in a conventional manner as a catalyst substrate, such as silica, the different forms of alumina, clays such as bentonites, montmorillonites, sepiolite, attapulgite, fuller's earth and synthetic porous materials such as silica-alumina, silica-zirconia, silica-thorin, silica-glucine or silica-titanium dioxide. Combinations of these binders can be considered within the scope of this invention.

Any suitable method for mixing the grains with a binder, known to one skilled in the art, can be used, in particular the methods that are suitable for the shaping of the catalyst in a form of extrudates, pellets, granules, balls or powder.

In the case where the catalyst comprises a metal compound, for example a hydrogenation/dehydrogenation component or another metal that has a catalytic activity, and a binder, the metal compound can be exchanged or impregnated in the grains or in the mixture with a binder and/or in the grain-binder composition. In the case where at least a portion of the metal compounds is impregnated or exchanged in the binder, this portion or all of these compounds can be one or more cations or oxides derived from elements that are selected from the group that is formed by Cu, Ag, Ga, Mg, Ca, Sr, Zn, Cd, B, Al, Sn, Pb, V, P, Sb, Cr, Mo, W, Mn, Re, Fe, Co, Ni, Pt, Pd, Re and Rh.

After the formation of the external layer of the grains of the catalyst, heat and chemical modification operations can be conducted to break down, for example, the structuring agents or the organic bonding agents or the organic substrate material if one is used and to put the zeolites in their desired cationic form.

The catalyst can be shaped by any technique that is known to one skilled in the art, in particular by granulation, by extrusion, by drying, by atomization, or by drop coagulation with a binder. The shaping is advantageously followed by a drying stage and a calcination stage. These shaped solids can also undergo heat and chemical treatments before use in the catalytic processes.

Example 1

Synthesis of a Catalyst that Comprises Grains Consisting of a Beta Zeolite Layer on a Y Zeolite Core The core is a Y zeolite (FAU structural type) that has undergone a modification treatment imparting to it the desired acidity (USY zeolite). It is obtained from the Zeolyst Company (© CBV780), is defined by an Si/Al ratio of 45, and comes in the form of 4-6 μm agglomerates that have 0.4-0.6 μm crystals.

The external layer is a beta zeolite. The formation of the layer comprises the preparation of nuclei, the adhesion of nuclei to the USY zeolite core, and the growth of the nuclei.

The preparation of beta zeolite nuclei that have an Si/Al ratio of about 17 is made in the following manner: 0.41 g of aluminum isopropoxide (Aldrich) is hydrolyzed in 6.50 g of 20% TEAOH solution (Fluka, tetraethylammonium hydroxide in aqueous solution, 20% by mass), and a second solution that contains 6.10 g of freshly freeze-dried colloidal silica (Akzo Nobel, Bindzil 30/220) dissolved in 20.00 g of 20% TEAOH solution is prepared. The two solutions are then mixed so as to obtain a clear solution. The final composition of this solution is:

9TEAOH:0.25 $Al_2O_3$:25 $SiO_2$:295 $H_2O$

The reaction mixture is introduced into a hermetic polypropylene bottle and put into the oven; the synthesis of the nuclei is done at 80° C. for 15 days. Once the synthesis is terminated, the nuclei are washed, dispersed and recovered by successive centrifuging cycles up to a pH that is close to 7. The pH of the colloidal suspension of the Beta zeolite nuclei is then adjusted to 9.5 by adding a 0.1% ammonia solution. A nanocrystal colloidal suspension that constitutes the nuclei with an average size of 100 nm results therefrom.

The adhesion is ensured by charge reversal of the USY zeolite crystal agglomerates. A cationic polymer solution (poly(diallyldimethylammonium chloride, marketed by the Aldrich company) at 0.5% by mass in water is prepared. The pH of this solution to brought to 9.5 by adding a 0.1% ammonia solution.

The USY zeolite and the cationic polymer solution are brought into contact for 1 hour in a (cationic polymer solution)/(crystals) mass ratio of 133. The crystals are recovered by decanting. Excess cationic polymer is eliminated by a washing sequence with an ammonia solution at 0.1% by mass in water.

The USY zeolite that is treated by the cationic polymer is brought into contact for 1 hour with the colloidal suspension of beta zeolite nuclei in a (colloidal suspension)/(crystals) mass ratio of 33. The solid that consists of beta zeolite nuclei adhering to the surface of the USY zeolite crystal agglomerates is recovered by decanting. Excess beta zeolite nuclei are eliminated by a washing sequence with an ammonia solution at 0.1% by mass in water.

To eliminate the cationic polymer and to form stable bonds between the USY zeolite core and the beta zeolite nuclei, the solid that consists of beta zeolite nuclei adhering to the surface of the USY zeolite core is subjected to a heat treatment (in air) comprising:
A rise in temperature from ambient temperature to 200° C. in 10 minutes,
A plateau of 1 hour,
A rise from 200° C. to 550° C. in 4 hours,
And a plateau at 550° C. for 4 hours.
The return to ambient temperature is done with the inertia of the furnace.

The growth of nuclei begins by an immersion of the solid that consists of beta zeolite nuclei adhering to the surface of the USY zeolite crystal agglomerates in an amount of synthesis solution defined above such that its mass is 100× greater than that of the crystals then kept at 100° C. for 7 days. The solid composite that consists of a beta zeolite layer adhering to the surface of the USY zeolite crystal agglomerates is recovered by decanting and washed with distilled water. The composite is then filtered and dried at 100° C. for 12 hours and calcined under the conditions of the heat treatment above.

The layer that is formed has an average thickness of 500 nm and a uniformity criterion of 0.1.

The composite that consists of a beta zeolite layer adhering to the surface of the USY zeolite agglomerates is mixed with an SB3-type alumina gel provided by the Sasol Company. The mixed paste is then extruded through a die with a diameter of 1.4 mm. The extrudates that are thus obtained are calcined at 500° C. for 2 hours in air. The content by weight of the beta/USY composite is 50% by weight.

Example 2

Synthesis of a Catalyst that Comprises Grains that Consist of a Silicalite-1 Zeolite Layer on a Beta Zeolite Core The core is a beta zeolite (BEA structural type) prepared according to the following method. Metal aluminum is dissolved in a 20% TEAOH solution (tetraethylammonium hydroxide in aqueous solution, 20% by mass) at ambient temperature, then centrifuged to eliminate the remaining impurities. The TEOS (tetraethoxysilane) is then added, and the mixture is left to be stirred until a dense gel is obtained (evaporation of alcohol and water at ambient temperature to obtain the necessary 6 mol of water). The addition of HF brings about the formation of a solid that it is necessary to break up as finely as possible before introducing it into the jacket of the autoclave. The synthesis is performed at 140° C. for 9.5 days; the final composition of the gel is:

0.55TEAOH:0.02 $Al_2O_3$:1 $SiO_2$:0.6 HF:6 $H_2O$

The reaction mixture is introduced into a Teflon-jacketed autoclave and put into the oven. The water that is present plays the role of solvent and ensures an autogenous pressure: the pressure inside the autoclave is equal to the saturating vapor pressure of the water at the temperature of the synthesis. Once the synthesis is terminated, the crystals are recovered in a filter, washed and then dried.

The beta zeolite can be defined by an Si/Al molar ratio of 25 and an average size of 20 µm.

The beta zeolite crystals are subjected to modification operations, i.e., to heat treatments and ion exchange operations. The first heat treatment in air comprises:
A rise in temperature from ambient temperature to 200° C. in 10 minutes,
A plateau of 1 hour,
A rise from 200° C. to 550° C. in 4 hours,
And a plateau at 550° C. for 4 hours.
The return to ambient temperature is performed with the inertia of the furnace.

These crystals have a specific surface area of about 600 m²/g.

The ion exchange is operated by suspending the beta zeolite in an ammonium nitrate solution with a 10 M concentration at about 100° C. for 4 hours. The crystals are recovered by filtration, washed with permuted water, then dried in an oven at 100° C. for 16 hours, and are subjected two other times to ion exchanges, filtrations, and washing and drying cycles.

A second heat treatment is then ensured under the same conditions as the first.

The external layer is the silicalite-1 zeolite. The formation of the layer comprises the preparation of the nuclei, their adhesion to the beta zeolite core, and the growth of the nuclei.

An aqueous suspension of nuclei that consist of nanocrystals that have a size of 100 nm of purely silicic MFI-structural-type zeolite (silicalite-1) is prepared. The zeolite mass in suspension is 4%.

The preparation of the silicalite-1 nanocrystals is performed in the following manner: 40.00 g of TEOS (Fluka, tetraethoxysilane) is hydrolyzed in 70.28 g of 20% TPAOH solution (Fluka, tetrapropylammonium hydroxide in aqueous solution, 20% by mass); 10.16 g of water is added, and the solution is then stirred so as to obtain a clear solution. The final composition of the solution is:

9TPAOH:25 SiO$_2$:480 H$_2$O:100 EtOH

The reaction mixture is introduced into a hermetic polypropylene bottle and put into the oven, and the synthesis is performed at 80° C. for 4 days. Once the synthesis has ended, the crystals are washed, dispersed and recovered by successive centrifuging cycles until a pH of close to 7 is obtained. The pH of the colloidal suspension of silicalite-1 nanocrystals is then adjusted to 9.5 by adding a 0.1% ammonia solution.

The adhesion of the silicalite-1 zeolite nuclei is ensured by reversing the charge of the beta-core zeolite. The beta zeolite crystals (BEA structural type) are subjected to the treatment described below.

A solution of cationic polymer (poly(diallyldimethylammonium chloride, marketed by the Aldrich Company) at 0.5% by mass in water is prepared. The pH of this solution is brought to 9.5 by adding a 0.1% ammonia solution.

The beta zeolite crystals and the cationic polymer solution are brought into contact for 1 hour in a (cationic polymer solution)/(crystals) mass ratio of 133. The crystals are recovered by decanting. Excess cationic polymer is eliminated by a sequence of washing with an ammonia solution at 0.1% by mass in water.

The beta zeolite crystals that are treated by the cationic polymer are brought into contact for 1 hour with the colloidal solution in a (colloidal solution)/(crystals) mass ratio of 33. The crystals are recovered by decanting. Excess MFI-structural-type zeolite is eliminated by a sequence of washing crystals with an ammonia solution at 0.1% by mass in water.

To eliminate the cationic polymer and to form stable bonds between the beta zeolite core and the silicalite-1 nuclei, the composite solid is subjected to the heat treatment that is described above.

The growth of the nuclei begins by an immersion of the composite solid that consists of silicalite-1 zeolite nuclei adhering to the surface of beta zeolite crystals in a clear synthesis solution defined by the molar composition 3TPAOH:25SiO$_2$:1500H$_2$O:100EtOH, such that its mass is 100× greater than that of the crystals but kept at 200° C. for 45 minutes.

This solution is obtained by mixing 28.92 g of TEOS, 136.54 g of distilled water and 16.94 g of TPAOH at 20% by mass in water.

The composite that consists of a silicalite-1 zeolite layer adhering to the surface of the beta zeolite crystals is recovered by decanting and washed with the distilled water. The composite is then filtered and dried at 100° C. for 12 hours.

The operations of adhesion and growth are repeated a second time with a growth period of 60 minutes (instead of 45 minutes).

The silicalite-1 layer that is formed has an average thickness of 1100 nm and a uniformity criterion of 0.08.

The composite that consists of a silicalite-1 zeolite layer adhering to the surface of the beta zeolite crystals is mixed with an SB3-type alumina gel provided by the Sasol Company. The mixed paste is then extruded through a die with a diameter of 1.4 mm. The thus obtained extrudates are calcined at 500° C. for 2 hours in air. The content by weight of the silicalite-1/beta composite is 50% by weight.

The invention claimed is:

1. A zeolite catalyst consisting essentially of grains, each grain being formed by a zeolite core covered by at least one external zeolite layer having a different crystallographic structure than that of the core, the core consisting essentially of an acidic crystallized microporous solid zeolite and having a size of between about 0.5 micron and about 20 microns, wherein the external layer is a crystallized microporous solid zeolite and has a uniform thickness with a uniformity criterion, C, which is less than 0.30, whereby said uniformity criterion C is defined as being equal to an average, on a number N of catalyst grain samples, of the ratio of the difference between the maximum thickness, $Ei_{max}$, of the external layer and the minimum thickness, $Ei_{min}$, of this same layer to the average of these two thicknesses $Ei_{max}$, and $Ei_{min}$, and with the provision that the grains have a spherical shape and have an overall average thickness of the external layer of between 0.1 and 10 microns yielding a maximum average grain size of about 40 microns.

2. A catalyst according to claim 1, wherein at least 95% of the surface of the core of the grains is covered by at least one external layer.

3. A catalyst according to claim 1, wherein the chemical composition of the core is different from that of the external layer.

4. A catalyst according to claim 1, wherein the crystallized microporous solid of the external layer has pores that have a diameter of between 0.1 and 2 nm.

5. A catalyst according to claim 1, wherein N is at least 100.

6. A catalyst according to claim 1, wherein the uniformity criterion C is less than 0.2.

7. A catalyst according to claim 1, wherein the uniformity criterion C is less than 0.1.

8. A catalyst according to claim 6, wherein N is at least 100.

9. A catalyst according to claim 7, wherein N is at least 100.

10. A catalyst according to claim 9, wherein at least 99% of the surface of the core of the grains is covered by at least one external layer.

11. A catalyst according to claim 1, wherein the grains consist essentially of a beta zeolite layer on a Y zeolite core and the uniformity Criterion is about 0.1.

12. A catalyst according to claim 1, comprising grains consisting essentially of a silica lite-1 zeolite layer on a beta zeolite core and wherein the silica lite-1 layer has an average thickness of about 1100 nm and a uniformity Criterion of about 0.08.

13. A catalyst according to claim 1, wherein the crystallized microporous solid of the external layer has pores that have a diameter of between 0.1 and 1.5 nm.

14. A catalyst according to claim 1, wherein the crystallized microporous solid of the external layer has pores that have a diameter of between 0.1 and 1 nm.

* * * * *